(12) United States Patent
Holcman

(10) Patent No.: US 7,107,900 B1
(45) Date of Patent: Sep. 19, 2006

(54) APPARATUS FOR ADDING AN EDIBLE FILLING TO A BAGEL AT A POINT OF SALE

(76) Inventor: Samuel Holcman, 6226 Laurain Ct., West Bloomfield, MI (US) 48322

( * ) Notice: Subject to any disclaimer, the term of this patent is extended or adjusted under 35 U.S.C. 154(b) by 3 days.

(21) Appl. No.: 10/912,625

(22) Filed: Aug. 6, 2004

Related U.S. Application Data

(62) Division of application No. 08/853,145, filed on May 8, 1997.

(51) Int. Cl.
*A21C 15/00* (2006.01)
*A21C 9/00* (2006.01)

(52) U.S. Cl. .................. 99/450.8; 99/450.7; 99/532

(58) Field of Classification Search ............... 99/450.8, 99/450.7, 450.6, 533, 532; 426/281, 283
See application file for complete search history.

(56) References Cited

U.S. PATENT DOCUMENTS

| | | | | | |
|---|---|---|---|---|---|
| 2,625,119 | A | * | 1/1953 | Jennings | 99/450.8 |
| 2,664,054 | A | * | 12/1953 | Galvin | 99/450.8 |
| 3,871,274 | A | * | 3/1975 | Hornby | 99/450.8 |
| 3,923,437 | A | * | 12/1975 | Gahagan | 425/130 |
| 4,928,592 | A | * | 5/1990 | Moshier et al. | 99/450.8 |
| 5,900,265 | A | * | 5/1999 | Rutherford | 426/281 |

* cited by examiner

*Primary Examiner*—Reginald L. Alexander
(74) *Attorney, Agent, or Firm*—Alex Rhodes

(57) ABSTRACT

An apparatus for enhancing the properties of a bagel by adding an edible filling in a soft porous interior portion of the bagel. In a first embodiment of the invention, the invention is comprised of a stand for mounting a bagel for rotation about a horizontal axis and an injector for piercing a hard outer crust of the bagel to form apertures at spaced apart locations around the circumference of the bagel and for injecting an edible filling into a soft porous interior portion of the bagel. In a second embodiment of the invention, the invention is comprised of a base for mounting the bagel and an injector for piercing the hard outer crust of the bagel to form apertures at spaced apart locations on a top surface of the bagel and for injecting the edible filling through the apertures into the soft porous interior portion of the bagel.

14 Claims, 6 Drawing Sheets

APPARATUS FOR ADDING AN EDIBLE FILLING TO A BAGEL AT A POINT OF SALE

This is a division of application Ser. No. 08/853,145, filed on May 8, 1997.

FIELD OF THE INVENTION

This invention relates to an apparatus for preparing bread products and more particularly to an apparatus for adding an edible filling to a bagel at a point of sale.

BACKGROUND OF THE INVENTION

Bagels are especially appealing to persons in need of a quick breakfast and the calorie conscious because they are ready to use, are filling, and are fat free. They are generally prepared at the points of sale, namely small retail bagel shops.

They are usually prepared by the following method: (1) preparing a raw dough, (2) shaping the raw dough into an annular form, (3) steaming or kettling the raw dough, and (4) baking the raw dough. This method produces a bread product having a thin substantially dense hard crust surrounding a soft porous interior. A variety of dough is used, including plain, pumpernickel, egg and onion flavored dough. The exteriors of some bagels are spiced with salt, poppy seed or sesame seed before baking. The different treatments causes complexity in bagel shops. Moreover, the diversity of bagels and baking times commonly result in purchasers waiting for bagels.

Other than differences in dough, and the addition of salts or spices, the various bagels are essentially similar dough products. After baking, they are generally converted into sandwiches or enhanced with edible substances, such as cream cheese, butter, margarine, jams or preserves. Slicing their thin hard crust requires high efforts and very sharp knives, frequently causing serious injuries, commonly referred to as "bagel thumb injuries." Adding cream cheese and other spreads is messy and requires frequent cleaning of workplaces, clothing, and knives.

Apparatus and methods for adding edible fillings to dough-like products exist in the art. U.S. Pat. No. 3,947,178 discloses an apparatus and method for injecting radially spaced discrete spots of filling material, such as, cream or jelly into a raw dough product, prior to cooking the product. U.S. Pat. No. 5,641,527 discloses an apparatus and method for adding an annular shaped filling of cream cheese to a raw bagel dough. Neither of these references teach or suggest adding an edible filling to an existing bagel at a point of sale.

SUMMARY OF THE INVENTION

The present invention is a departure from the current practices by adding edible fillings to the soft porous interior portions of a bagel at a point of sale. One benefit is that the complexity at bagel shops and/or restaurants is reduced using a single type of bagel with a variety of fillings. Another benefit is that a greater variety of bagel products can be offered with a common apparatus at a point of sale. Another benefit is an improvement in worker safety by eliminating bagel slicing with sharp knives.

The invention resides in the ability of the apparatus to efficiently and economically add edible fillings to the soft porous interior portions of bagels at a point of sale. One distinguishing feature of the invention is the piercing of a hard outer crust of a bagel at multiple locations for injecting edible fillings. Another distinguishing feature of the invention is its ability to uniformly distribute edible filings throughout a porous interior of a bagel.

In a first embodiment of the invention, the invention is comprised of a stand for rotating a bagel about a horizontal axis and an injector for piercing a hard outer crust of the bagel to form apertures at spaced apart locations around the circumference of the bagel and injecting an edible filling in the soft porous interior portion of the bagel. In a second embodiment of the invention, the invention comprises a base for mounting the bagel and an injector for piercing the hard outer crust of the bagel to form apertures at spaced apart locations on a top surface of the bagel and injecting the edible filling through the apertures into the soft porous interior portion of the bagel.

Further benefits and features of the invention will become apparent from the following detailed description and drawings that disclose the invention. The property in which exclusive rights are claimed is set forth in each of the numbered claims at the conclusion of the detailed description.

BRIEF DESCRIPTION OF THE DRAWINGS

The invention will be better understood and further objects, characterizing features, details and advantages thereof will appear more clearly with reference to the diagrammatic drawings illustrating a presently preferred specific embodiment of the invention by way of non-limiting example only.

DETAILED DESCRIPTION OF A PREFERRED EMBODIMENT

Figure 1:
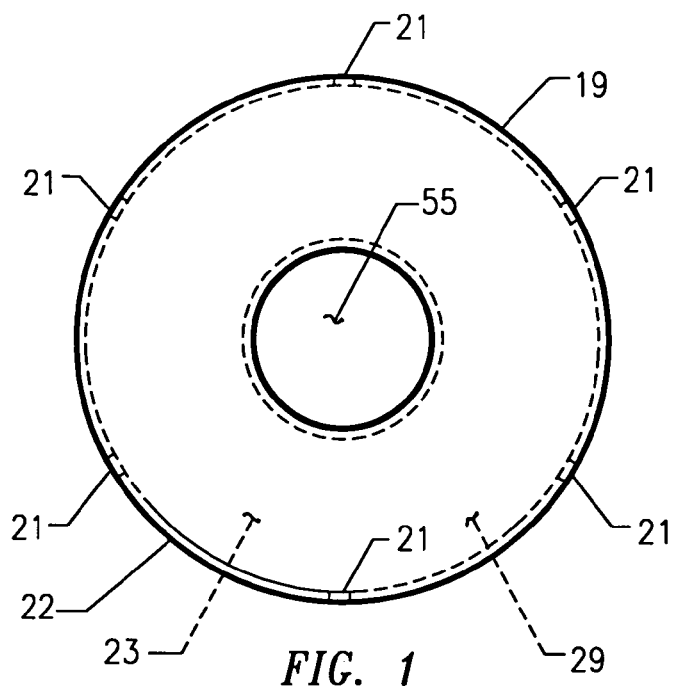
FIG. 1 is a plan view of a pre-filled bagel according to my invention.

Referring now to the drawings in which like numerals designate similar and corresponding parts throughout the several views, in FIGS. 8 through 11, a first aspect of a pre-filled bagel 20 is shown according to my invention.

Six small circular markings are spaced around the circumference of the bagel 20. The markings are the exposed portions of an edible filling 29, such as cream cheese, which is injected through punctures 21 in the thin hard crust 22, throughout the soft porous interior portion 23 of the bagel 20.

Although six punctures 21 are preferable, it is not my intention to limit my invention to this number, it being contemplated that about four to eight punctures 21 will satisfy the objectives of my invention, the greater number improving the distribution of the edible filling 29. The diameter of a puncture 21 is preferably about one-eighth of an inch but can be as small as one-sixteenth of an inch and as large as three-eighths of an inch or greater.

During the development of my invention, various amounts of fillings were injected into bagels. The bagels were cut and the distributions of the filling throughout the interiors were evaluated. In working with this procedure, it was determined that a trial and error method was an efficient and quick method for determining the optimal amount of filling for a single bagel. By way of example, a uniform distribution was achieved in a bagel filled with cream cheese when the bagel was punctured at six spaced apart positions and 4 cc. of cream cheese was injected into each puncture for a total of 24 cc. It was also determined that when the amount of cream cheese varied somewhat less than this amount, the distribution was not uniform throughout the interior and when the amount varied somewhat more than this amount, the cream cheese tended to squeeze out of the punctures when the bagel was consumed. For these reasons is recommended that minimum and maximum amounts of a filling should be determined using the previously described trial and error procedure as well as the optimum amount. It was further determined from tests that when the distribution of cream cheese was uniform throughout a bagel, a substantial improvement was achieved in the taste and enjoyment of the bagel.

Figure 4:
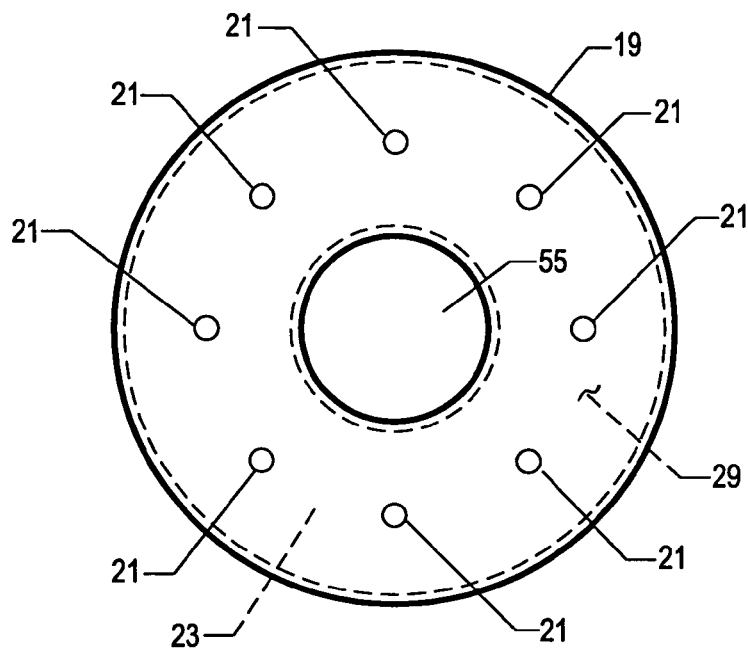
FIG. 4 is a plan view of a second embodiment of a filled bagel according to my invention.
Figure 5:
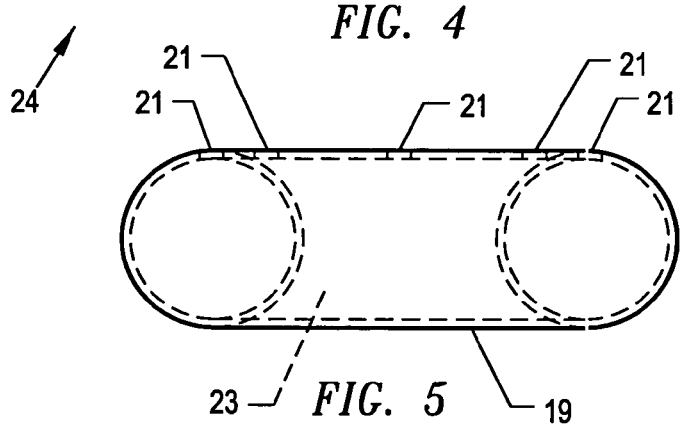
FIG. 5 is a front view of the second embodiment.
Figure 6:
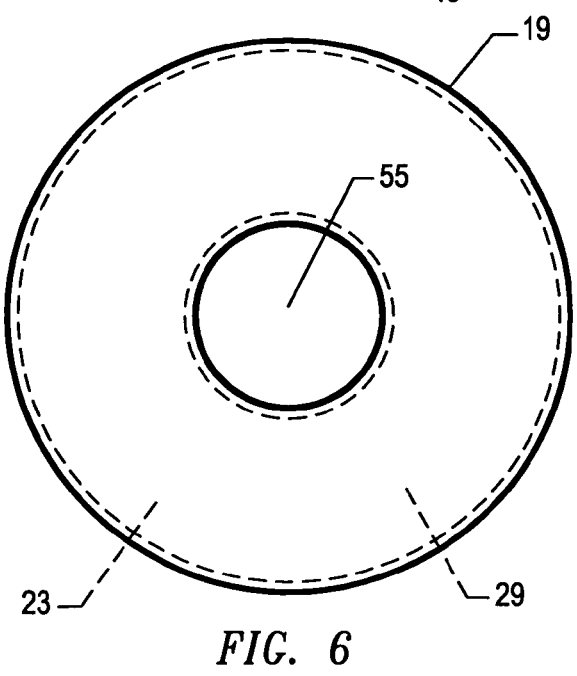
FIG. 6 is a bottom view of the second embodiment.
Figure 7:
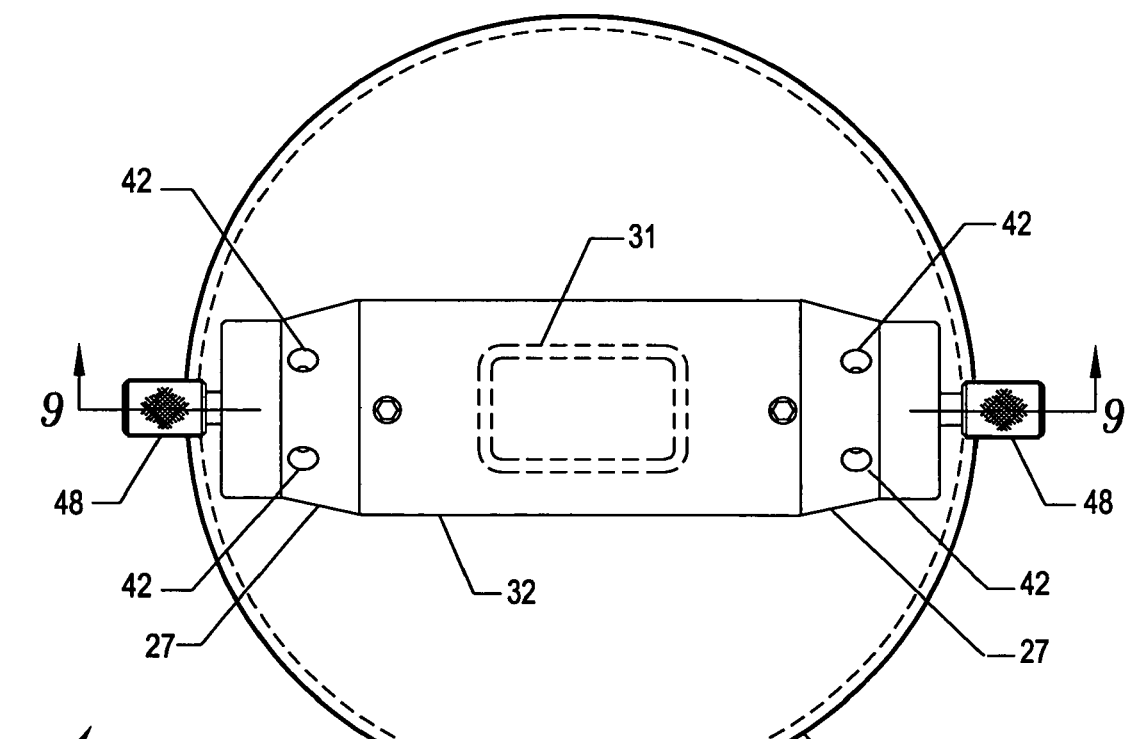
FIG. 7 is a plan view of an apparatus for puncturing and filling a bagel through a plurality of small openings around the circumference of the bagel.
Figure 8:
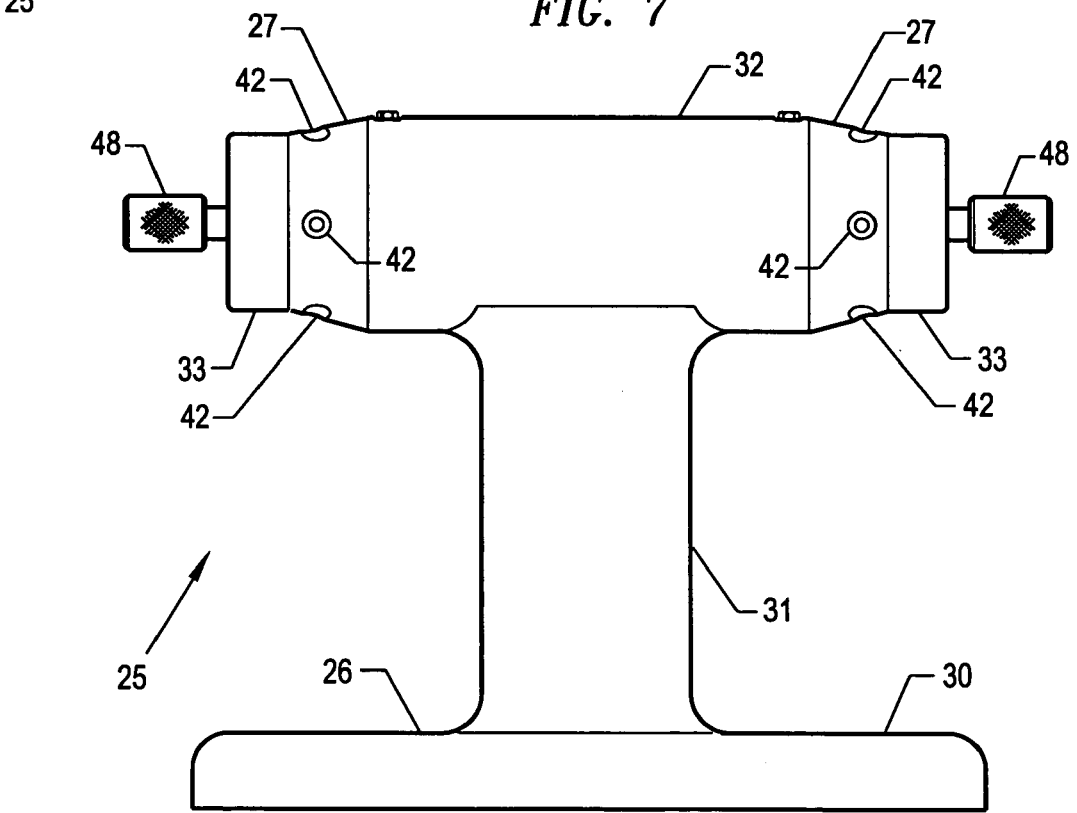
FIG. 8 is a front view of the apparatus.

In FIGS. 4 through 6, a second aspect 24 of my invention is shown wherein a conventional bagel is punctured at six locations on the top portion of the bagel 24 and edible filling 29 is injected through the punctures 21 into its soft interior 23.

Figure 2:
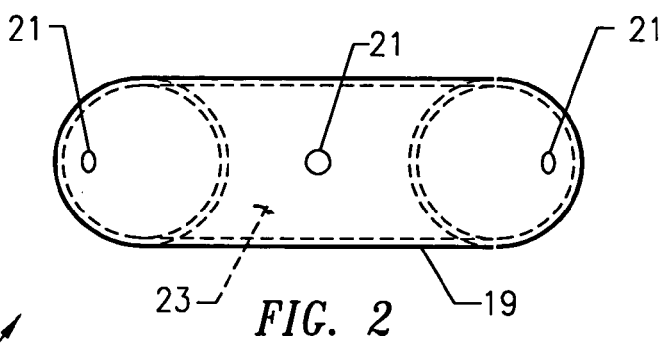
FIG. 2 is a front view of the bagel.
Figure 3:
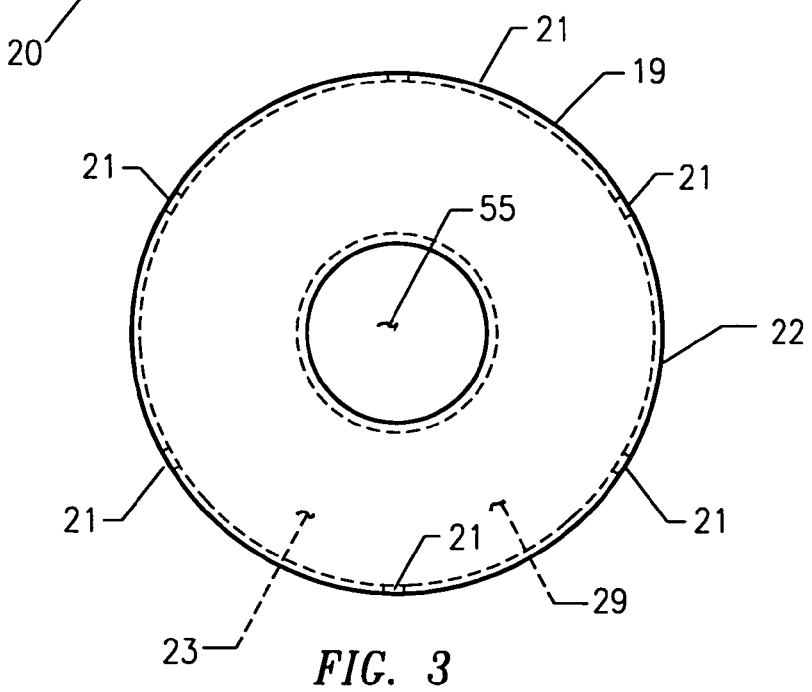
FIG. 3 is a bottom view of the bagel.

Referring now to FIGS. 7 through 11, an apparatus 25 is shown according to the first aspect depicted in FIGS. 1 through 3, inclusive. The apparatus 25 comprises a stand 26, a pair of interconnected bagel housings 27 mounted on the stand for rotation about a horizontal axis, a pair of end caps 33 and an injector 28.

Figure 9:
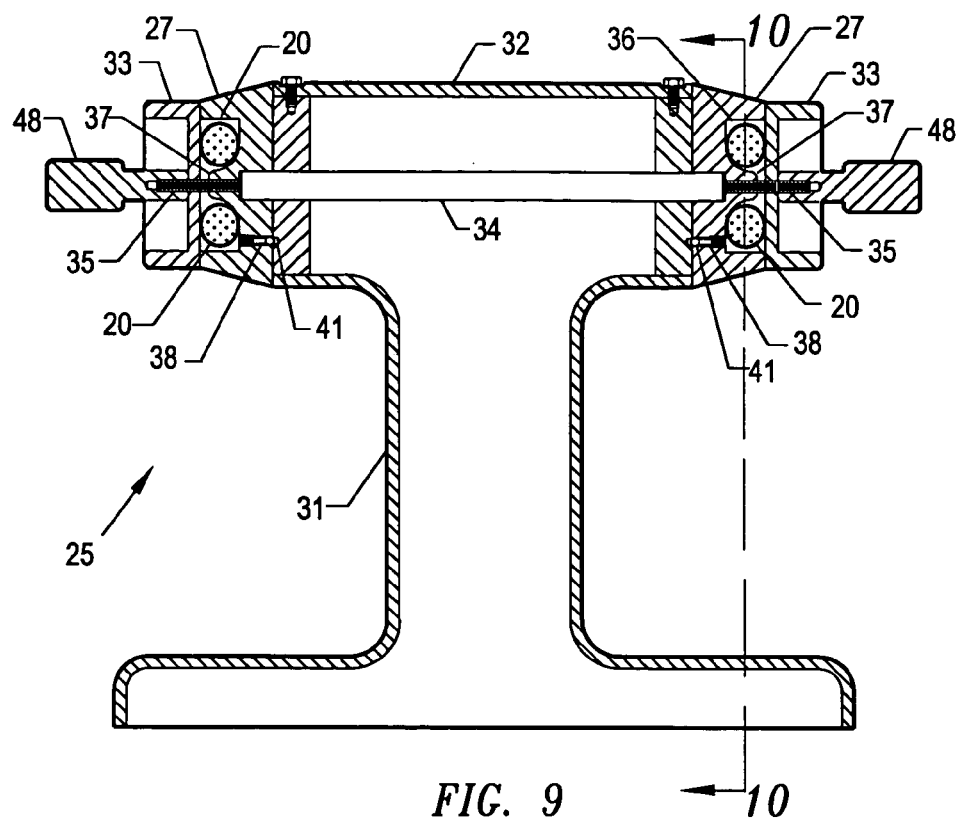
FIG. 9 is a cross-sectional view taken on the line 9—9 in FIG. 7.
Figure 10:
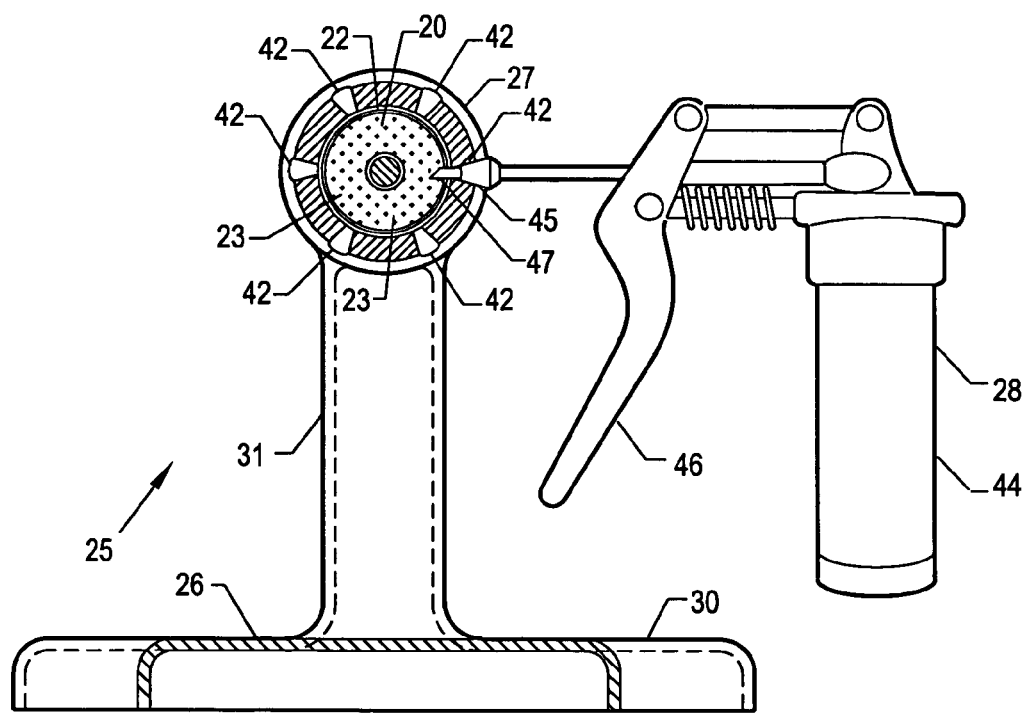
FIG. 10 is a cross-sectional view taken on the line 10—10 in FIG. 9.
Figure 11:
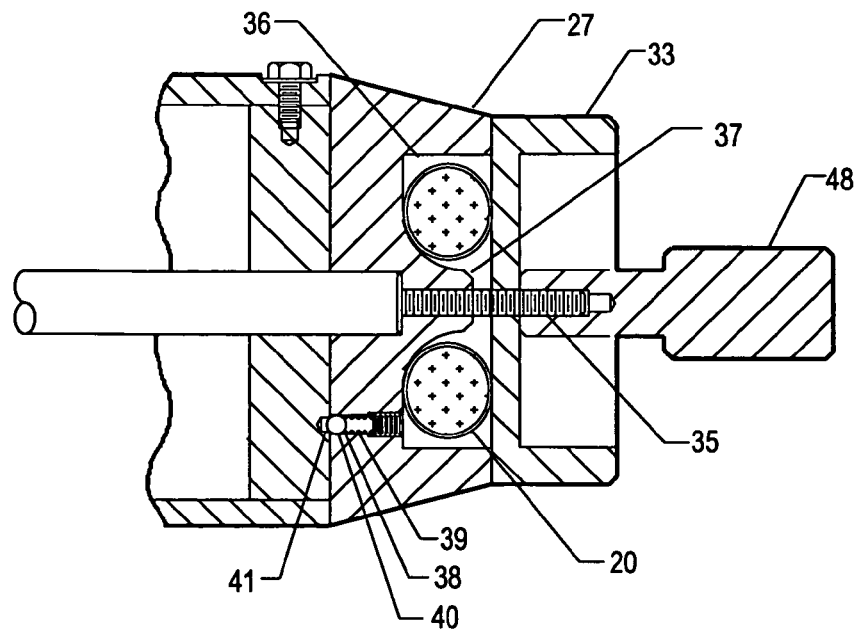
FIG. 11 is an enlarged fragmentary view of FIG. 10.

The construction of the apparatus 25 is best understood by reference to FIGS. 9 through 11. The stand 26 comprises a circular base portion 30, a vertical upward extending portion 31 and a cylindrical horizontal upper portion 32. The bagel housings 27 are rotatably attached at opposite end portions of the stand's upper portion 32. The caps 33 are removably attached to end portions of the bagel housings 27.

A thin cylindrical shaft 34 is journalled in the stand 26 and has opposite threaded end portions 35 which engage hand tightening nuts 48 to retain the bagel housings 27 to the stand 26. The bagel housings 27, which are rotatable, are tapered cylindrical members with cavities for receiving the bagels 20. The centers of the cavities 36 are preferably pilot portions 37 for centering the bagels 20 in the housings 27. Six equally spaced detents 38 comprised of springs 39 and balls 40 engage depressions 41 in the stand 26 for indexing the housings 27 during the injections of the filling 29. As shown in FIG. 10, six tapered apertures 42 extend through the sides of each of the bagel housings 27.

The threaded end portions 35 of the pilot shaft 34 extend through the bagel housings 27 to engage the thumb nuts 48 and clamp the bagels 20 to the housings 27. With reference to FIG. 10, the applicator 28 for puncturing and injecting the edible filling 29 is a conventional hand pump. It includes a detachable reservoir 44 for storing the filling 29 and a tapered nozzle 45 for engaging the tapered apertures 42 in the bagel housings 27. The handle 46 is used to inject the filling 29 through the apertures 42 into the bagels 20. Each complete stroke of the handle 46 preferably injects an optimum amount of filling 29 into the bagels 20. The end of the nozzle 45 is a thin sharp tubular portion 47 for puncturing the bagels 20.

The edible filling 29 is injected into a pair of bagels 20 in the following manner. The bagels 20 are loaded into the housings 27 and securely clamped with the end caps 33 and thumb nuts which engage the threaded ends 35 of the pivot shaft 34. The tapered nozzle 45 is pressed into a tapered aperture 42 of the bagel housing 27 to puncture the bagels 20. The handle 46 is squeezed to inject a portion of the filling 29 through the aperture 42. The applicator 28 is then disengaged and the housing 27 is rotated to engage a detent 38 with an adjacent depression 41 in the stand 26. It will be observed that the interconnected housings 27 allow either housing 27 to be rotated, thus improving efficiency by allowing both hands to be used.

Figure 12:
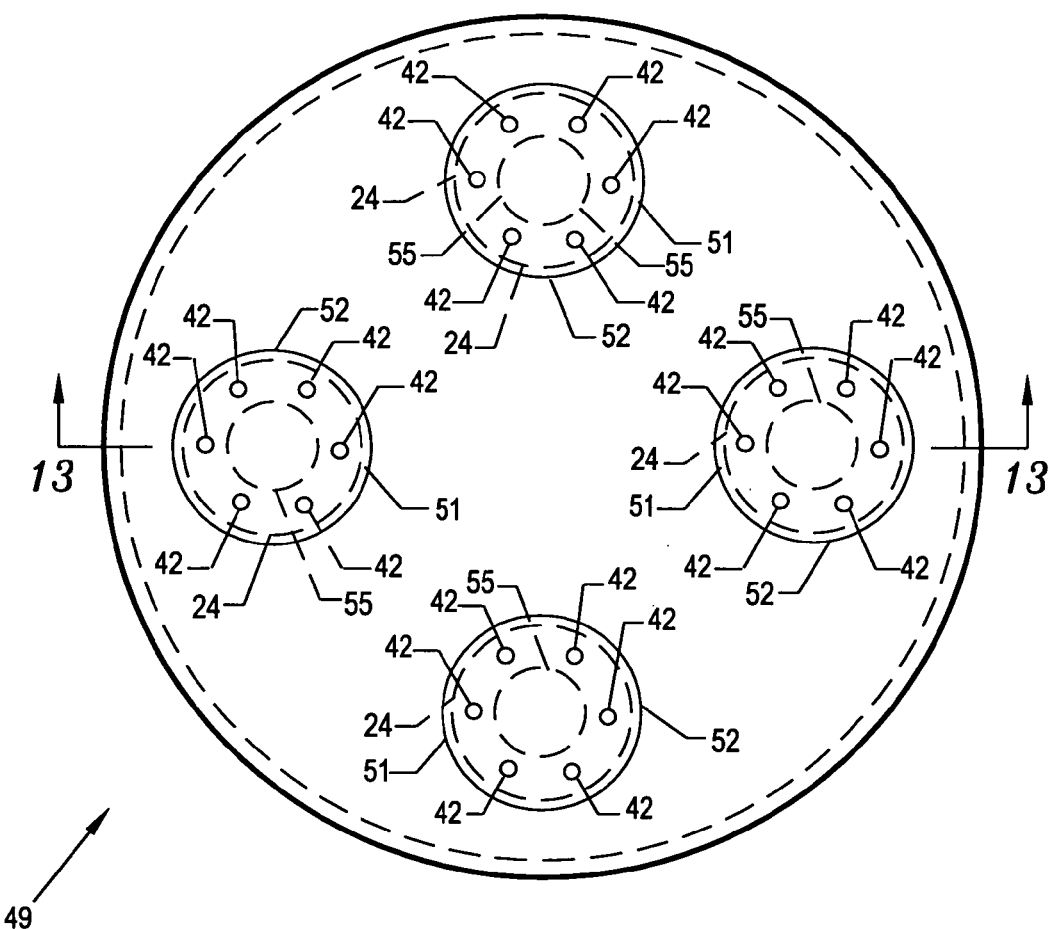
FIG. 12 is a plan view of an apparatus for puncturing and filling a bagel through a plurality of small openings in a top surface of a bagel.

Referring now to FIGS. 11 and 12, an apparatus 49 is shown for puncturing and injecting the edible filling 29 into four bagels 24 at multiple sites through apertures on a top surface which is perpendicular to an axis which passes through a center of the bagel 24 to produce the embodiment 24 of FIGS. 4 through 6. The apparatus 49 comprises a base 50, four covers 51 threadably engaged with the base and the applicator 28. The base 50 is a generally circular member having four fixed cylindrical upper portions 52 with cavities 53 for receiving the bagels 24. In the top portion of each cover 51 are the six radially spaced apart tapered apertures 42 for receiving the tapered nozzle 45 of the applicator 28. A filling 29 is injected into the bagel 24 with this apparatus 49 by pressing the injector's tapered nozzle 45 into each of the tapered aperture's 42 and squeezing the handle 46.

Figure 13:
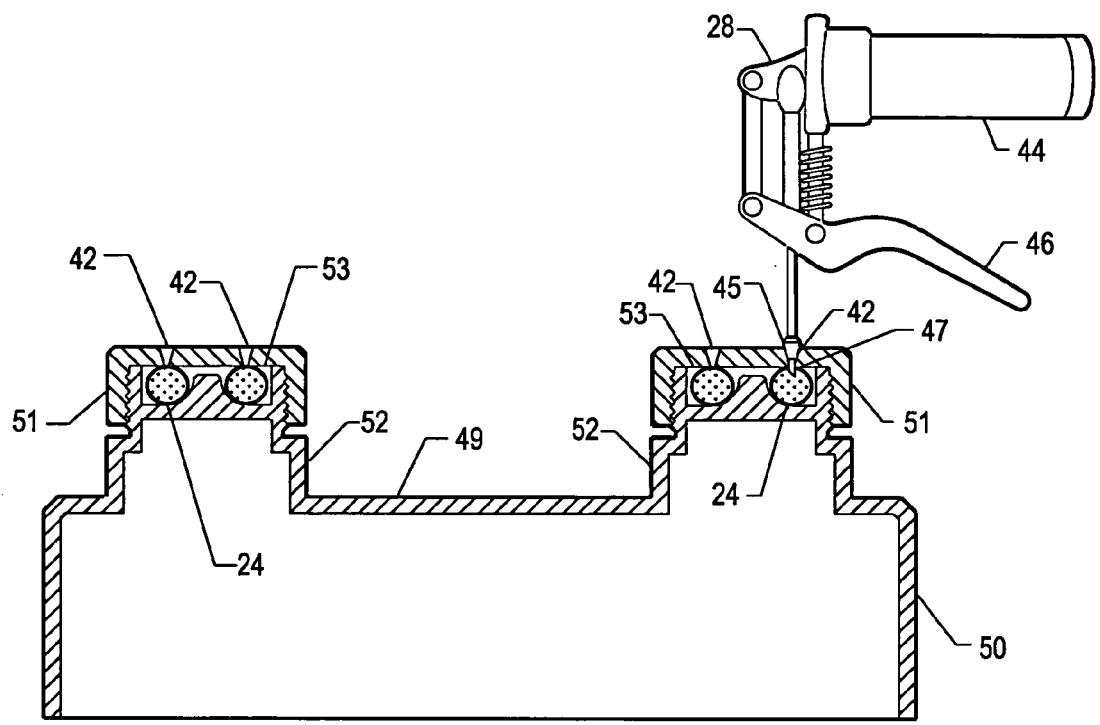
FIG. 13 is a cross-sectional view taken on the line 13—13 in FIG. 9.
Figures 14, 15:
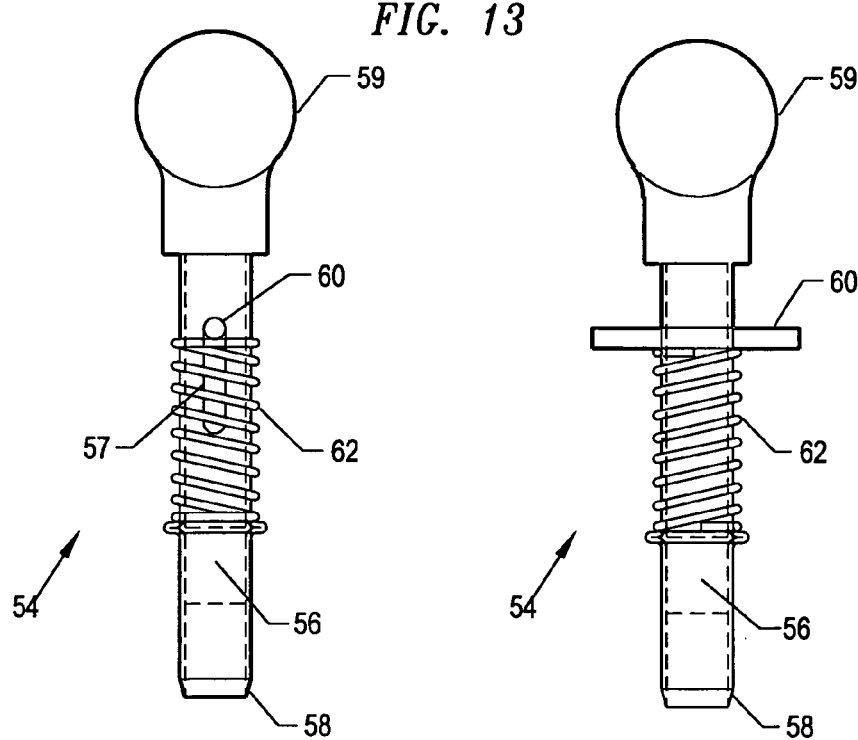
FIG. 14 is a front view of a tool for cutting a pilot hole in the center of a bagel.
FIG. 15 is a left side view of the tool shown in FIG. 14.

In FIGS. 13 and 14, I have shown a device 54 for sizing the aperture 55 in the center of the bagel 24. The device 54 is comprised of a thin tubular punch 56 and a close fitting ejector 57 slidably mounted in the tubular punch 56. The tubular punch 56 is a sharp end portion 58 which sizes the aperture 55 of the bagel 24 and a knob 59 at an opposite end portion. A cross bar 60 extends through the ejector 56 and projects through a pair of slots 57 in the tubular punch 56. On the outside of the tubular punch 56 is a helical spring 62 which biases the ejector 57 towards the knob 59. The sharp end portion 58 of the tubular punch 54 is pressed against the center of the bagel 24 and excess material is removed by moving the ejector 57 with the cross bar 60.

From the foregoing, it will be understood that my invention provides an apparatus for enhancing the properties of a bagel in a manner previously unavailable. Moreover, it provides an effective, easy to use apparatus for adding edible fillings to a bagel which overcomes the drawbacks of existing apparatus. Although only several embodiments of my invention have been described, it is not my intention to limit my invention to these embodiments, since other embodiments can be derived by changes known to persons skilled in the art in materials, shape, substitution and arrangement of steps without departing from the spirit thereof.

I claim:

1. An apparatus for adding an edible filling to a bagel at a point of sale comprising: a stand for supporting at least one bagel, said stand having a base and a housing for retaining and rotating said bagel in a series of steps about an axis passing through a center of said bagel to inject an edible filling through apertures in a thin outer crust of said bagel; and an injector for injecting said edible filling into a soft porous interior portion of said bagel through said apertures in said thin hard outer crust of said bagel, said apertures spaced around said axis of rotation of said bagel.

2. The apparatus recited in claim 1 further comprising a means for piercing said thin hard crust of said bagel to form said apertures.

3. The apparatus recited in claim 1 further comprising a means for storing said edible filling.

4. The apparatus recited in claim 2 further comprising a means for equally spacing said apertures around said circumference of said bagel.

5. The apparatus recited in claim 1 wherein said apertures are equally spaced around said axis of rotation of said bagel and said injector is capable of injecting said edible filling through said apertures in said crust to uniformly distribute said edible filling throughout said soft porous interior of said bagel.

6. The apparatus recited in claim 5 wherein said edible filling is cream cheese.

7. The apparatus recited in claim 5 wherein said edible filling is a preserve.

8. An apparatus for adding an edible filling to a bagel at a point of sale comprising: a means for supporting and rotating said bagel in a series of steps about an axis passing through a center of said bagel; and an injector for injecting about 24 cc. of an edible filling into a soft porous interior portion of said bagel through apertures in a thin hard outer crust of said bagel, said injector having a means for piercing said bagel to form four to six of said apertures around said axis of rotation of said bagel and a means for storing said edible filling.

9. An apparatus for adding an edible filling to a bagel at a point of sale comprising: a means for supporting a bagel; a means for rotating said bagel in a series of steps around an axis passing through a center of said bagel; and an injector for injecting about 24 cc. of an edible filling into a soft porous interior portion of the bagel through apertures in a thin hard outer crust of said bagel, said injector having a means for piercing said bagel to form four to six apertures in a plane which is perpendicular to said axis of rotation of said bagel which passes through said center of said bagel, and a means for storing said edible filling.

10. An apparatus for adding an edible filling to a bagel at a point of sale comprising: a means for retaining said bagel; a means for storing an edible filling; a means for piercing a thin hard outer crust of said bagel to form a series of radially spaced apart apertures in said thin hard outer crust around a center of said bagel, said apertures having diameters within a range of one-sixteenth to three-eights of an inch; a means for rotating said bagel in a series of steps around an axis passing through said center of said bagel; a means for injecting under pressure through said apertures said edible filling to distribute said edible filling into a soft porous interior portion of said bagel.

11. The apparatus recited in claim 10 wherein said apertures are located in said thin hard outer crust around a circumference of said bagel.

12. The apparatus recited in claim 10 wherein said apertures are located on a top surface of said bagel which is perpendicular to an axis which passes through a center of said bagel.

13. The apparatus recited in claim 10 further comprising a means for sizing an aperture in a center of said bagel.

14. The apparatus recited in claim 13 wherein said means for sizing said aperture in said center of said bagel comprises a thin tubular punch; a resiliently biased ejector slidably mounted in an interior of said punch; and a coil spring for resiliently biasing said ejector.

\* \* \* \* \*